(12) United States Patent
Benincasa et al.

(10) Patent No.: US 12,515,884 B2
(45) Date of Patent: Jan. 6, 2026

(54) VIBRATORY MOTION CONVEYOR SYSTEM FOR SYRINGE PLUNGERS

(71) Applicant: W. L. Gore & Associates, Inc., Newark, DE (US)

(72) Inventors: John S. Benincasa, Newark, DE (US); Erik M. LaRose, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 78 days.

(21) Appl. No.: 18/580,382

(22) PCT Filed: Jul. 19, 2022

(86) PCT No.: PCT/US2022/037540
§ 371 (c)(1),
(2) Date: Jan. 18, 2024

(87) PCT Pub. No.: WO2023/003841
PCT Pub. Date: Jan. 26, 2023

(65) Prior Publication Data
US 2025/0091812 A1    Mar. 20, 2025

Related U.S. Application Data

(60) Provisional application No. 63/223,159, filed on Jul. 19, 2021.

(51) Int. Cl.
*B65G 27/04*    (2006.01)
*B65G 47/14*    (2006.01)

(52) U.S. Cl.
CPC ......... *B65G 27/04* (2013.01); *B65G 47/1421* (2013.01)

(58) Field of Classification Search
None
See application file for complete search history.

(56) References Cited

U.S. PATENT DOCUMENTS 3,260,347 A * 7/1966 Barnes ............... B65G 47/1421
                                                    198/398
6,257,392 B1   7/2001 Graham
(Continued)

FOREIGN PATENT DOCUMENTS

CN    105775680 A    7/2016
CN    110680995 A    1/2020
(Continued)

OTHER PUBLICATIONS

International Preliminary Report on Patentability received for PCT Patent Application No. PCT/US2022/037540, mailed on Feb. 1, 2024, 8 pages.
(Continued)

*Primary Examiner* — Kavel Singh

(57) ABSTRACT

A track (12) for a vibratory motion conveyor system having a length configured to support a plurality of syringe plungers (20a), each syringe plunger (20a) of the plurality of syringe plungers having a top (33), a bottom (1), and a contact feature (23) positioned between the top and bottom of the syringe plunger. The track (12) includes a first shoulder portion (16) extending along the length of the track (12) having a first support surface defining a first inner edge, and a second shoulder portion (18) extending along the length of the track having a second support surface defining a second inner edge. The first and second inner edges are arranged opposite one another such that the first and second support surfaces are configured to support the contact feature of each syringe plunger (20a) such that a portion of each syringe plunger passes between the first and second inner edges of the first and second support surfaces, respectively.

20 Claims, 9 Drawing Sheets

(56) References Cited

U.S. PATENT DOCUMENTS

| | | | | |
|---|---|---|---|---|
| 6,467,607 B1* | 10/2002 | Daugy | ............... | B65G 47/1492 |
| | | | | 198/398 |
| 7,955,031 B2* | 6/2011 | Powell | ............... | B65G 47/1421 |
| | | | | 406/75 |
| 10,017,329 B2* | 7/2018 | Seitel | ................... | B65G 47/525 |

FOREIGN PATENT DOCUMENTS

| | | |
|---|---|---|
| JP | 06-023931 U | 3/1994 |
| JP | 2008-285242 A | 11/2008 |

OTHER PUBLICATIONS

International Search Report and Written Opinion received for PCT Patent Application No. PCT/US2022/037540, mailed on Nov. 10, 2022, 11 pages.

* cited by examiner

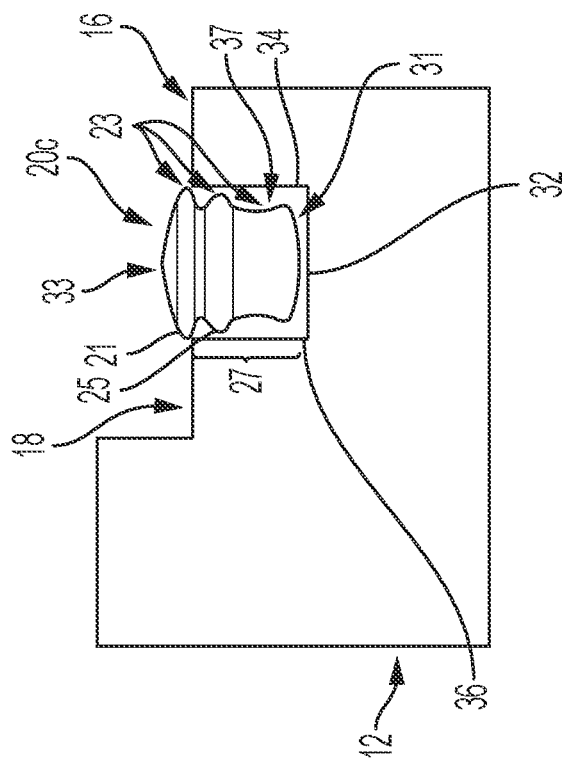
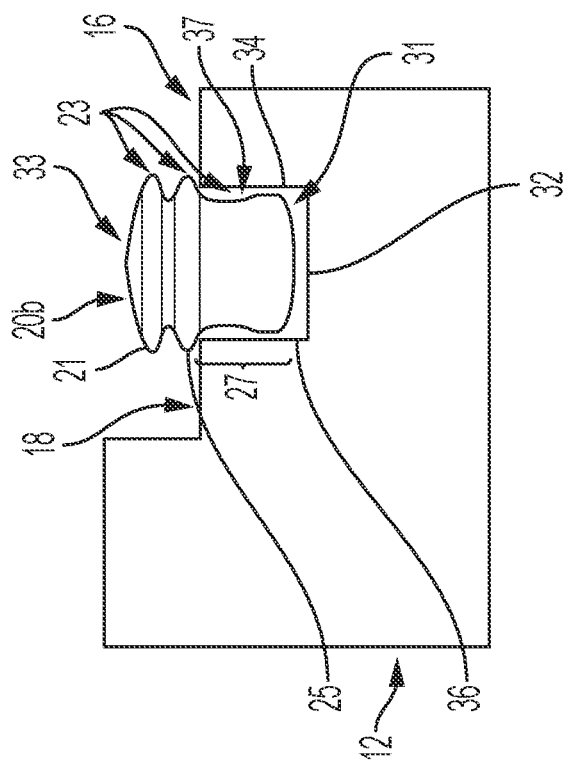

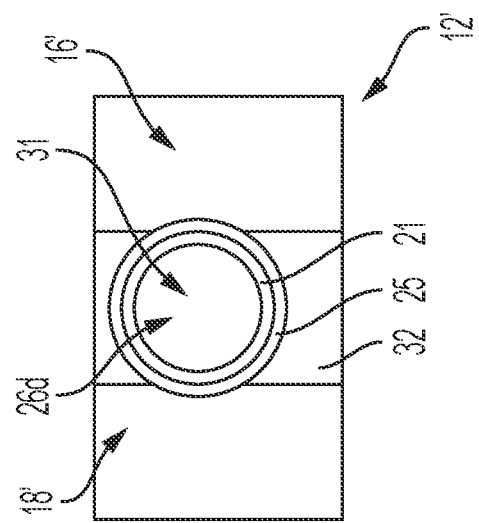
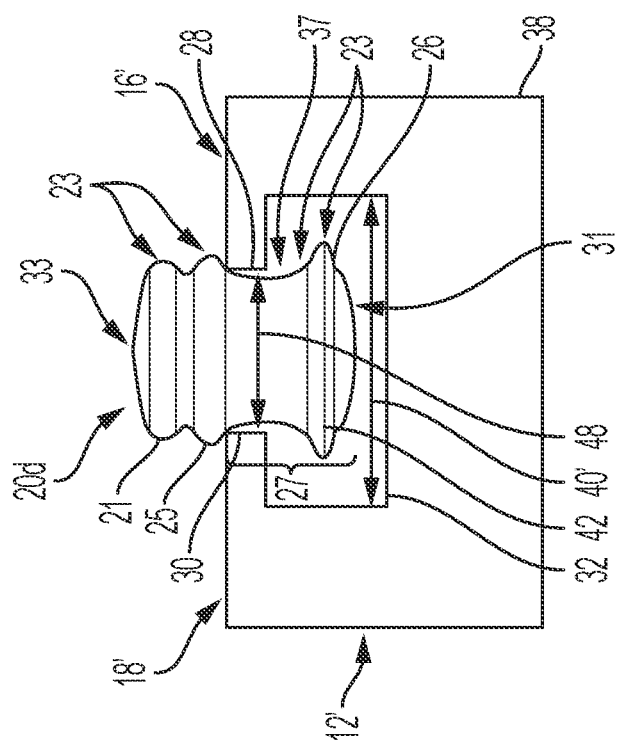
FIG. 7B
FIG. 7A

VIBRATORY MOTION CONVEYOR SYSTEM FOR SYRINGE PLUNGERS

CROSS-REFERENCE TO RELATED APPLICATION

This application is a national phase application of PCT Application No. PCT/US2022/037540, internationally filed on Jul. 19, 2022, which claims the benefit of Provisional Application No. 63/223,159, filed Jul. 19, 2021, both of which are incorporated herein by reference in their entirety for all purposes.

FIELD

The present disclosure relates generally to apparatuses, systems and methods of use of vibratory tracks for the transport of materials, such as syringe plungers.

BACKGROUND

Vibratory feeding systems are a known technology for moving components within a vibratory bowl or linear track, including those described in the U.S. Pat. No. 8,733,539 to Choy, et al. Such systems can include a vibration feeding bowl and a linear vibration feed track with two motors for driving the motion of the vibratory feeding bowl and linear feed track. The linear feed track may include a horizontal base and two side portions which together create a U-shaped track. As one example, U.S. Pat. No. 5,131,525 to Musschoot discloses a vibratory conveyer system for driving components down a material-carrying trough through vibratory motion. The trough of Musschoot is shown to be U-shaped in some examples and rectangular in others, the trough having two sides, a base, and a top to enclose the track.

In terms of particular applications for such systems, it is known to transport syringe plungers using vibratory tracks. For example, Hutem company of Seoul Korea provides a vibratory track system in the form of the HFS-4000 product that includes a "rubber stopper feeding system" including one or more vibratory tracks having a U-shape.

SUMMARY

According to a first example ("Example 1"), a track for a vibratory motion conveyor system has a length configured to support a plurality of syringe plungers, each syringe plunger of the plurality of syringe plungers having a top, a bottom, and a contact feature, the contact feature optionally being a circumferential rib feature, and the contact feature being positioned between the top and bottom of the syringe plunger. The track further includes a first shoulder portion extending along the length of the track, the first shoulder portion having a first support surface defining a first inner edge and a second shoulder portion extending along the length of the track opposite to the first shoulder portion, the second shoulder portion having a second support surface defining a second inner edge. The first and second inner edges are arranged opposite one another such that the first and second support surfaces are configured to support the contact feature of each syringe plunger such that a portion of each syringe plunger passes between the first and second inner edges of the first and second support surfaces, respectively.

According to a second example ("Example 2"), the track of Example 1 includes a base portion having a bottom, a first side extending from the bottom, and a second side extending from the bottom, the second side being located opposite the first side, and further wherein the first shoulder portion is located at the top of the first side and the second shoulder portion is located at the top of the second side.

According to a third example ("Example 3"), the track of Example 2 includes wherein the base portion is U-shaped, with the first and second sides extending orthogonally from the bottom of the base portion.

According to a fourth example ("Example 4"), the track of Example 2 or Example 3 includes wherein the first and second inner edges of the first and second shoulder portions are aligned with the first and second sides of the base portion.

According to a fifth example ("Example 5"), the track of Example 2 or Example 3 further includes wherein the first and second inner edges of the first and second shoulder portions extend inwardly from the first and second sides of the base portion such that the first and second edges of the first and second shoulder portions define a narrowed width relative to a width between the first and second sides of the base portion.

According to a sixth example ("Example 6"), the track of Example 4 further includes wherein the first and second inner edges of the first and second shoulder portions are spaced from one another to define a width that is less than a maximum outer diameter of each syringe plunger of the plurality of syringe plungers.

According to a seventh example ("Example 7"), a vibratory motion conveyor system includes a vibration frequency generator and a track operatively coupled to the vibration frequency generator. The track has a length configured to support a plurality of syringe plungers, each syringe plunger of the plurality of syringe plungers having a bottom and a contact feature that is optionally a circumferential rib feature. The track further includes a first shoulder portion extending along the length of the track, the first shoulder portion having a first support surface defining a first inner edge, and a second shoulder portion extending along the length of the track opposite to the first shoulder portion, the second shoulder portion having a second support surface defining a second inner edge. The first and second inner edges are arranged opposite one another such that the first and second support surfaces are configured to support the contact feature of each syringe plunger such that a portion of each syringe plunger passes between the first and second inner edges of the first and second support surfaces, respectively, and the bottom of each syringe plunger does not contact the track.

According to an eighth example ("Example 8"), the system of Example 7 includes a base portion having a bottom, a first side extending from the bottom, and a second side extending from the bottom, the second side being located opposite the first side, and further wherein the first shoulder portion is located at the top of the first side and the second shoulder portion is located at the top of the second side.

According to a ninth example ("Example 9"), the system of Example 8 further includes wherein the base portion is U-shaped, with the first and second sides extending orthogonally from the bottom.

According to a tenth example ("Example 10"), the system of any of Examples 7 to 9 further includes wherein the vibration frequency generator is operable to apply a vibratory frequency from 1 to 180 hertz.

According to an eleventh example ("Example 11"), a method of conveying a plurality of syringe plungers with a vibratory motion conveyor system includes feeding the plurality of syringe plungers into a track operatively coupled to a vibration frequency generator, each syringe plunger of the plurality of syringe plungers having a contact feature that is optionally a circumferential rib feature, the track having a first shoulder portion extending along the track and a second shoulder portion extending along the track opposite to the first shoulder portion, supporting the contact feature of each of the plurality of syringe plungers with a first support surface of the first shoulder portion and a second support surface of the second shoulder portion such that each syringe plunger extends between first and second inner edges of the first and second support surfaces, respectively and the bottom of each of the syringe plungers does not contact the track. The method further includes vibrating the track with the vibration frequency generator such that the plurality of syringe plungers travel along the track.

According to a twelfth example ("Example 12"), the method of Example 11 further includes wherein the track is vibrated at a frequency from 1 to 180 hertz.

According to a thirteenth example ("Example 13"), the method of Example 11 or Example 12 further includes wherein the circumferential rib feature of each of the plurality of syringe plungers corresponds to a maximum outer diameter of each of the plurality of syringe plungers.

According to a fourteenth example ("Example 14"), the method of any of Examples 11 to 13 further includes wherein each of the plurality of syringe plungers is free of silicone oil.

According to a fifteenth example ("Example 15"), the method of any one of Examples 11 to 14 further includes wherein the track includes a base portion having a bottom, a first side extending from the bottom, and a second side extending from the bottom, the second side being located opposite the first side, and further wherein each of the plurality of syringe plungers travels along the track without contacting the bottom of the base portion of the track.

According to a sixteenth example ("Example 16"), the method of any one of Examples 11 to 15 includes wherein the contact feature includes a fluoropolymer material, optionally polytetrafluoroethylene.

According to a seventeenth example ("Example 17"), a track fora vibratory motion conveyor system configured to support a plurality of syringe plungers, each syringe plunger of the plurality of syringe plungers having a contact feature, the contact feature being positioned between a top surface and a bottom surface of the syringe plunger, includes a first shoulder portion extending along a length of the track, the first shoulder portion having a first support surface defining a first inner edge and a second shoulder portion extending along the length of the track opposite to the first shoulder portion, the second shoulder portion having a second support surface defining a second inner edge, the first and second inner edges being arranged opposite one another such that the first and second support surfaces are configured to support the contact feature of each syringe plunger.

According to an eighteenth example ("Example 18"), the track of Example 17 includes wherein the contact feature of each of the plurality of syringe plungers is a circumferential rib feature.

According to a nineteenth example ("Example 19"), the track of Example 17 further includes wherein the contact feature of each of the plurality of syringe plunger is a generally indented portion of each syringe plunger.

According to a twentieth example ("Example 20"), the track of any one of Examples 17 to 19 further includes wherein a portion of each of the plurality of syringe plungers passes between the first inner edge of the first shoulder portion and the second inner edge of the second shoulder portion of the track.

According to a twenty-first example ("Example 21"), the track of any one of Examples 17 to 20 further includes wherein the contact feature is positioned at a longitudinal distance from a center of mass of each of the syringe plungers that is less than a longitudinal distance between the bottom surface of each of the syringe plungers and the center of mass of each of the syringe plungers.

According to a twenty-second example ("Example 22"), the track of Example 21 includes wherein each syringe plunger has a center of mass and the contact feature is located above the center of mass of each of the syringe plungers.

According to a twenty-third example ("Example 23"), a track for vibratory motion conveyor system includes the track having a length configured to support a plurality of syringe plungers, each syringe plunger of the plurality of syringe plungers having at least one contact feature and a bottom surface, and the at least one contact feature having a contact surface area that is smaller than a surface area of a planar projection of the bottom surface. The track further includes a first shoulder portion extending along the length of the track, the first shoulder portion having a first support surface defining a first inner edge, and a second shoulder portion extending along the length of the track opposite to the first shoulder portion, the second shoulder portion having a second support surface defining a second inner edge. The first and second inner edges are arranged opposite one another such that the first and second support surfaces are configured to support the at least one contact feature of each syringe plunger.

According to a twenty-fourth example ("Example 24"), the track of Example 23 further includes wherein the contact surface area comprises a lower limit and an upper limit, such that stiction between the contact surface area and the track is reduced.

According to a twenty-fifth example ("Example 25"), the track of Example 23 further includes wherein the contact surface area is between 0.1% and 5% of the surface area of the planar projection of the bottom surface of each plunger.

According to a twenty-sixth example ("Example 26"), the track of Example 23 or Example 24 further includes wherein the contact surface area has a ratio to a width defined between the first inner edge and the second inner edge of 1.0% to 12.0%.

According to a twenty-seventh example ("Example 27"), the track of any one of Examples 23 to 26 further include wherein the contact feature of each syringe plunger is a circumferential rib feature of each of the plurality of syringe plungers.

According to a twenty-eighth example ("Example 28"), a track for a vibratory motion conveyor system is configured to support a plurality of syringe plungers, each syringe plunger of the plurality of syringe plungers having one or more points of contact with the track, each syringe plunger of the plurality of syringe plungers having a center of mass between a top and bottom surface, and the one or more points of contact being between the top and bottom surface. The track includes a first shoulder portion extending along a length of the track, the first shoulder portion having a first support surface defining a first inner edge, and a second shoulder portion extending along the length of the track opposite to the first shoulder portion, the second shoulder portion having a second support surface defining a second inner edge, the first and second inner edges being arranged opposite one another such that the first and second support surfaces are configured to support each syringe plunger at the at least one point of contact.

According to a twenty-ninth example ("Example 29"), the track of Example 28 further includes wherein the one or more points of contact are located longitudinally closer to the center of mass of each syringe plunger than the bottom surface of each syringe plunger is located relative to the center of mass of each syringe plunger.

According to a thirtieth example ("Example 30"), the track of Example 28 or Example 29 further includes wherein the one or more points of contact are positioned above a center of mass of each syringe plunger.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 5A is a cross-sectional view of the track of FIG. 3 supporting a syringe plunger, according to some embodiments; and FIG. 5B is a cross-sectional view of the track of FIG. 3 supporting a syringe plunger, according to some embodiments, FIG. 7A is a cross-sectional view of the track of FIG. 6 supporting a syringe plunger, according to some embodiments, and FIG. 7B is a top view of the track of FIG. 7A, according to some embodiments.

DETAILED DESCRIPTION

Definitions and Terminology

Figure 1:
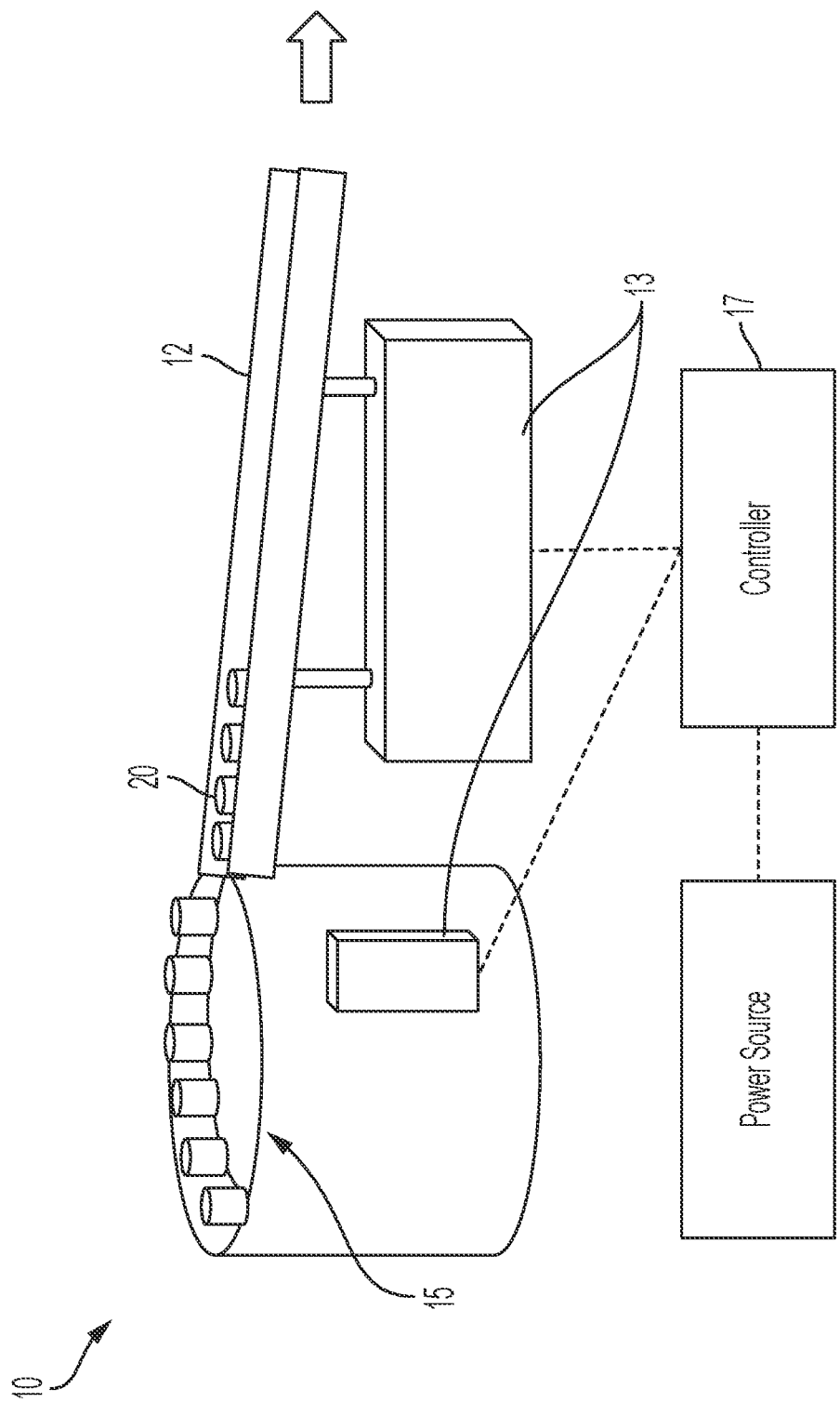
FIG. 1 shows a vibratory motion conveyor system, according to some embodiments.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

As used herein, the term "syringe plunger" is meant to be inclusive of any of a variety of injector devices that include a plunger, also described as a stopper, received in a barrel and an actuation mechanism configured to displace the plunger within the barrel to eject, or deliver contents held in the barrel from within the barrel. Examples of injector devices include syringes, auto-injectors, pens, and the like.

The center of mass of a distribution of mass in space corresponding to the syringe plunger is the unique point where the weighted relative position of the distributed mass of the syringe plunger sums to zero. This is the point to which a force may be applied to cause a linear acceleration without an angular acceleration of the syringe plunger.

DESCRIPTION OF VARIOUS EMBODIMENTS

Various aspects of this description relate to systems for conveying components, such as syringe plungers, also described as syringe stoppers, that are free of lubricants such as silicone oil. Syringe plungers and similar components, which are generally formed of rubber or rubber-like material, have been discovered to present unique vibratory track requirements. For example, the components being conveyed (e.g., syringe plungers) and the tracks themselves may be substantially free of lubricant (e.g., silicone, or silicone oil) at the areas where the components contact the tracks. This feature of being "lubricant free" may cause throughput issues in traditional track designs. Various concepts in this description leverage the geometry of the components to help ensure the components maintain a desired positioning within the track when conveyed (e.g., generally vertically positioned with a longitudinal axis of the plunger in a vertical orientation, or other orientation as desired) and do not tip over or otherwise become unaligned or dislodged from within the linear track and without causing blockage within the tracks (e.g., when stiction between the syringe plungers and track cannot be overcome). Moreover, in some examples, the contact interface where the component contacts the track corresponds to one or more portions of the component that includes a relatively low friction material (e.g., expanded polytetrafluoroethylene, or "ePTFE" to assist with avoiding such throughput issues. For reference, when blockage occurs, rectification requires operator intervention, decreasing efficiency, increasing the potential for contamination, and any of a variety of other undesirable results.

FIG. 1 shows a vibratory motion conveyer system 10, according to some embodiments. The vibratory motion conveyer system 10 is configured to convey, or translate, a plurality of syringe plungers 20 along a track 12 of the system 10. One track 12 is illustrated in FIG. 1, although the system 10 may include any number of tracks 12 as desired (e.g., two, four, eleven, and so forth). As shown, the system 10 includes a controller 17, the track 12, a vibration frequency generator 13 operatively coupled to the track 12, as well as a feeder bowl 15 positioned adjacent the track 12 and operatively coupled to the vibration frequency generator 13. The controller 17 is used to operate the vibration frequency generator 13, according to various embodiments.

In various embodiments, the controller 17 may include a control panel or other user interface. The vibration frequency generator 13 is operable to apply a vibration frequency from 0 to 300 hertz, for example, such as 60 hertz, although variety of conditions are contemplated. As shown, the track 12 is configured to support and translate a plurality of syringe plungers 20 in a relatively uniform, and repeatable manner. The vibratory frequency generator 13 may include an actuator configured for electromagnetic actuation to produce the vibration frequency which is then applied to the track 12 and the feeder bowl 15 through a spring. This electromagnetic actuator may include, but is not limited to, an electrical motor, one or more solenoid actuators and one or more moving coil actuators, for example.

Figure 2:
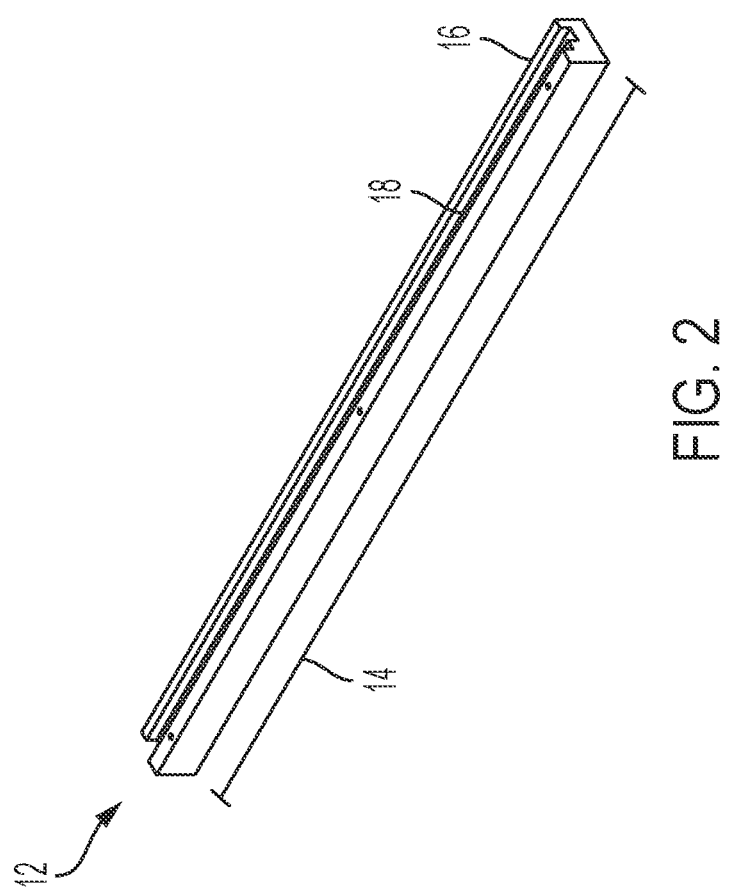
FIG. 2 is a perspective view of a track of the vibratory frequency conveyer system of FIG. 1, according to some embodiments.

FIG. 2 shows a perspective view of the track 12 of the system 10 of FIG. 1, according to some embodiments. The track 12 has a length 14 suitable for supporting the plurality of syringe plungers 20 (FIG. 1). In various instances, the track 12 is formed of a metallic material, such as, but not limited to, stainless steel alloys, although any of a variety of materials suitable for vibratory conveyance are contemplated. The track 12 may include any of a variety of surface treatments (e.g., coatings, surface polishing, or the like) to promote performance of the track 12. The track may be formed from casting, molding, milling, machining and/or extrusion processes, for example. In various examples, the track 12 is substantially free of an added lubricant, such as silicone (e.g., silicone oil).

Figure 3:
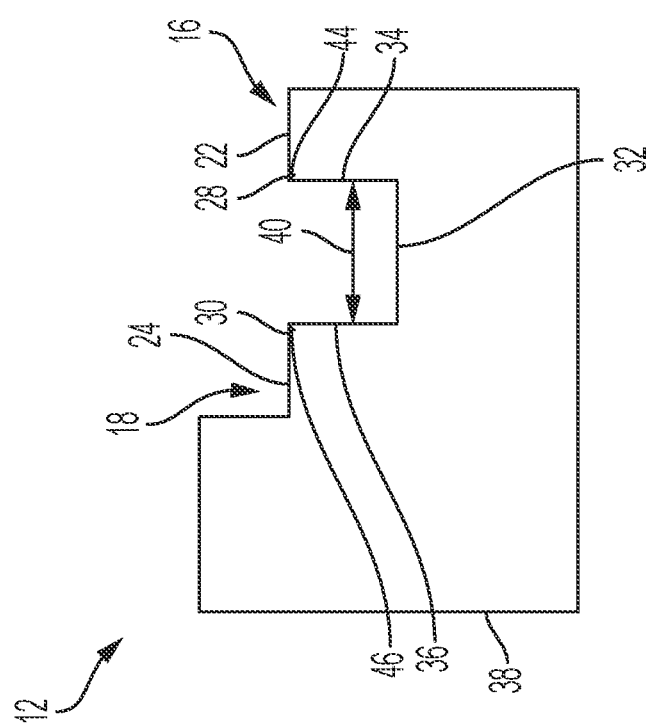
FIG. 3 is a cross-sectional view of the track of FIG. 2, according to some embodiments.

FIG. 3 shows a cross-sectional view of the track 12 of FIG. 2, according to some embodiments. As shown, the track 12 includes a base portion 38 that, in turn, includes a bottom 32, a first side 34 extending from the bottom 32, and a second side 36 extending from the bottom 32. The track 12 also includes a first shoulder portion 16 located at the top of the first side 34 of the base portion 38 and a second shoulder portion 18 located at the top of the second side 36 of the base portion 38. The first and second shoulder portions 16, 18 each extend along the length 14 (FIG. 2) of the track 12 (e.g., along an entire length of the track, or only along one or more portions thereof). The first shoulder portion 16 includes a first support surface 22 which defines a first inner edge 28. And, the second shoulder portion 18 includes a second support surface 24 which defines a second inner edge 30.

As shown, the second side 36 of the base portion 38 is located opposite the first side 34. The base portion 38 is generally U-shaped, according to some embodiments, with the first side 34 and the second side 36 both extending from the bottom 32. In some examples, the first side 34 and the second side 36 extend orthogonally from the bottom 32 and each have a height that are equal. The height of each the first side 34 and the second side 36 may be chosen based on the dimensions of the plurality of syringe plungers 20 (FIG. 1). In various embodiments, the dimensions of the track 12 are selected such that the height of the first side 34 and the second side 36 are greater than the height of a suspended portion, or a first portion, of each of the plurality of syringe plungers 20.

The first and second inner edges 28, 30 may be aligned with the first and second sides 34, 36, respectively, of the base portion 38. In this way, the first and second inner edges 28, 30 are spaced from one another to define a width 40. The width 40 may be chosen based on the features of each of the plurality of syringe plungers 20 (FIG. 1), such that a portion of each of the plurality of syringe plungers 20 is supported by the first and second shoulder portions 16, 18 of the track 12, as will be described further with respect to FIGS. 4, 5A and 5B.

The width 40 between the first and second sides 34, 36 of the base portion 38 is generally greater than the diameter of the portion of each of the stoppers 20 that is received between the first and second sides 34, 36. For example, in various embodiments, the width 40 is greater than a diameter of a portion of each of the syringe plungers 20 that extends below the first and second inner edges 28, 30.

In various embodiments, each of the first and second inner edges 28, 30 are radiused, chamfered, or otherwise modified in an effort to reduce potential plunger damage during conveyance along the inner edges 28, 30. For example, the first inner edge 28 can define a first radius of curvature 44 and the second inner edge 30 can define a second radius of curvature 46. The first radius of curvature 44 and the second radius of curvature 46 may be substantially the same. In various embodiments, the first radius of curvature 44 and the second radius of curvature 46 each have a value that typically does not exceed a distance that a contact feature extends from a main body of each of the plurality of syringe plungers 20 (FIG. 2). In other words, the radius of curvature is typically not greater than the width of the contact feature. Various surface modifications may be applied to the first and second inner edges 28, 30 such as a surface coating of the edges, or varying the radius of curvatures 44, 46, to promote performance of the track 12.

Figure 4:
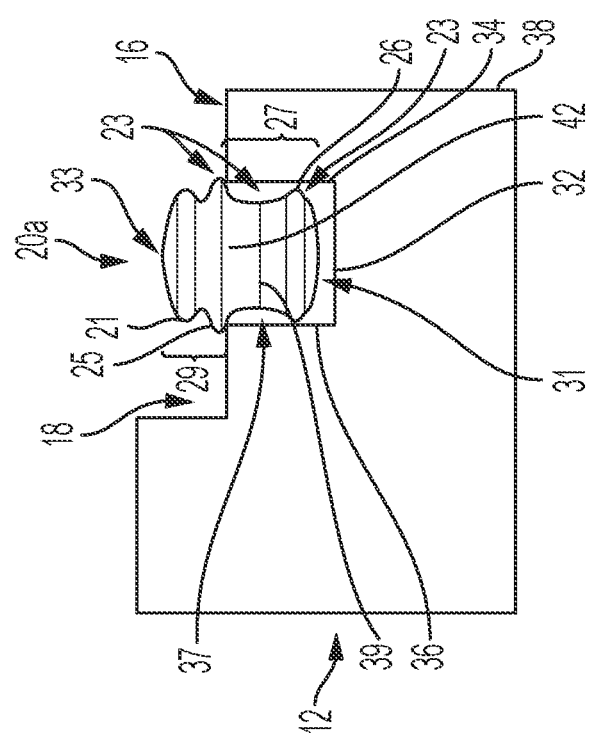
FIG. 4 is an additional cross-sectional view of the track of FIG. 3 supporting a syringe plunger, according to some embodiments.

FIG. 4 shows a cross-sectional view of the track 12 of FIG. 3 with a first syringe plunger 20a of the plurality of syringe plungers 20 positioned within the track 12. While the first syringe plunger 20a is shown in use with the track 12 of FIG. 3, it is also contemplated the syringe plunger 20a may similarly be used with the track 12' illustrated in FIG. 6. For future reference, the description that follows with respect to first syringe plunger 20a is applicable to each of the plurality of syringe plungers 20, although any of a variety of syringe plungers designs are contemplated.

As shown, the first syringe plunger 20a, and thus each of the plurality of syringe plungers 20, comprises atop surface 33 and a bottom surface 31. The top surface 33 comprises a top surface area, and the bottom surface 31 comprises a bottom surface area, as will be described further with reference to FIGS. 7A and 8. In some embodiments, the top surface area and the bottom surface area are approximately equal. As shown, the first syringe plunger 20a includes a first circumferential rib feature 21, a second circumferential rib feature 25, and a third circumferential rib feature 26. Although three circumferential rib features, or ribs, are shown, any number of circumferential rib features is contemplated. The first syringe plunger 20a also includes at least one indented area, also described as a groove, such as the first indented area 37. As shown in FIG. 4, the second circumferential rib feature 25 corresponds to a maximum outer diameter 42 of the first syringe plunger 20a. Although the second circumferential rib feature 25 corresponds to the maximum diameter in some examples, in various embodiments having multiple ribs, any of the ribs may be constructed to define the maximum outer diameter 42. As shown, the first syringe plunger 20a includes a third circumferential rib feature 26 arranged below the second circumferential rib feature 25. As shown, the third circumferential rib feature 26 has a slightly smaller diameter than the second circumferential rib feature 25, although any of a variety of configurations are contemplated, including circumferential rib features having smaller or greater diameters, or greater or fewer circumferential rib features.

The first syringe plunger 20a includes one or more contact features 23 positioned along the first syringe plunger 20a between the top surface 33 and the bottom surface 31 of the first syringe plunger 20a. The one or more contact features 23 corresponds to a portion, or portions of the first syringe plunger 20a that engage with the track 12. In general terms, the first syringe plunger 20a rides upon the one or more contact features 23 as the first syringe plunger 20a traverse along the track 12. The contact feature 23 may include one or more circumferential rib features, such as the second circumferential rib feature 25 as shown in FIG. 4. Although the second circumferential rib feature 25 is shown performing as the contact feature 23, it should be understood that the track 12 may be configured such that another circumferential rib feature serves as the contact feature 23.

As indicated in FIG. 4, the first syringe plunger 20a defines a first portion 27 and a second portion 29. The first portion 27 includes a length, or portion of the first syringe plunger 20a, between the bottom surface 31 of the first syringe plunger 20a and the one or more contact features 23 supported by the track 12. As shown in FIG. 4, the first portion 27 includes the portion of the first syringe plunger 20a between the bottom surface 31 of the first syringe plunger 20a and the second circumferential rib feature 25. The second portion 29 is defined as a length, or portion of the first syringe plunger 20a between the one or more contact features 23 supported by the track 12 (the second circumferential rib feature 25 in FIG. 4), and the top surface 33 of the first syringe plunger 20a.

As shown, the first portion 27 includes the third circumferential rib feature 26 and the relatively indented areas that is the first indented area 37 positioned between the second and third circumferential rib features 25, 26. The first indented area 37 may be defined by a minimum outer diameter 39 of the first syringe plunger 20a. The contact feature 23 may be defined by a circumferential rib feature having the largest diameter (e.g., the second circumferential rib feature 25 as shown in FIG. 4), or may be defined by a circumferential rib feature having another relative diameter. As shown in FIG. 4, the diameters of each additional circumferential rib feature of first portion 27 (the third circumferential rib feature 26 as shown in FIG. 4) are less than the maximum outer diameter 42 at the contact feature 23, which is the second circumferential rib feature 25 in FIG. 4.

By having the first portion 27 of the first syringe plunger 20a define a smaller diameter than the contact feature 23, the first portion 27 is able to be received within the square slot defined by between the first and second sides 34, 36. In different terms, the smaller diameter of the first portion 27 ensures the first portion 27 may be positioned between the first and second sides 34, 36. The second portion 29 may define a smaller diameter than the one or more contact features 23, or a larger diameter as desired. The second portion 29 may include additional circumferential rib features (e.g., the first circumferential rib feature 21 as shown). Regardless, the diameter defined at any longitudinal position of the second portion 29 may be greater than, equal to or less than the maximum outer diameter 42. From the foregoing, it is to be appreciated the one or more contact features 23 of each of the plurality of syringe plungers 20 may vary with respect to number, size, shape, and location, as will be even further described with reference to FIGS. 5A, 5B, and 7A.

The plurality of syringe plungers 20 may be formed using a variety of techniques, including molding, lasering, machining, and others. In various embodiments, the first syringe plunger 20a can be formed of a variety of polymeric, elastic and/or elastomeric materials such as, but not limited to thermoplastic elastomers, butyl rubber, and silicone. In some embodiments, one or more portions of the first syringe plunger 20a, including an entirety of the first syringe plunger 20a may be coated with a barrier film. In various examples, the bottom surface 31 is uncoated and/or includes an exposed elastomeric surface (e.g., butyl rubber or silicone). Non-limiting examples of suitable barrier films include fluoropolymer films and expanded fluoropolymer films, such as, but not limited to, polytetrafluoroethylene (PTFE) and expanded polytetrafluoroethylene (ePTFE) films. Barrier films based on ePTFE provide for thin and strong barrier layers to leachables and extractables. The barrier film may also include an expanded polymeric material including a functional tetrafluoroethylene (TFE) copolymer material having a microstructure characterized by nodes interconnected by fibrils, where the functional TFE copolymer material includes a functional copolymer of TFE and PSVE (perfluorosulfonyl vinyl ether), or TFE with another suitable functional monomer, such as, but not limited to, vinylidene fluoride (VDF), vinyl acetate, or vinyl alcohol.

As shown in FIG. 4, during use, the track 12 is configured to support the first syringe plunger 20a, and therefore each syringe plunger of the plurality of syringe plungers 20. As previously described, a portion of the first syringe plunger 20a (the first portion 27 as shown) passes between the first and second inner edges 28, 30 (FIG. 3) of the track 12. The first and second inner edges 28, 30 of the first and second shoulder portions 16, 18, respectively, engage the one or more contact features 23 (the second circumferential rib feature 25) of each of the plurality of syringe plungers 20, as illustrated with respect to the first syringe plunger 20a.

The width 40 (FIG. 3) of the track 12 is configured such that it is less than the maximum outer diameter 42 of the syringe plunger 20a (e.g., less than the diameter of the one or more contact features 23), but it is greater than a diameter of the first portion 27 of the first syringe plunger 20a, including the third circumferential rib feature 26. In this way, the first portion 27 of the first syringe plunger 20a is inserted into the track 12 and the one or more contact feature 23, the second circumferential rib feature 25 as shown, is supported by first support surface 22 of the first shoulder portion 16 and the second support surface 24 of the second shoulder portion 18 of the track 12. As illustrated in FIG. 4, the first and second inner edges 28, 30 engage the first syringe plunger 20a at one or more points of contact with a portion of the first syringe plunger 20a having a diameter that is greater than a diameter of a portion just below it. In this way, the syringe plunger 20a is received and suspended between the first and second inner edges 28, 30, but does not require direct contact or engagement at the maximum diameter 42 of the syringe plunger 20a. For example, the first and second inner edges 28, 30 may also engage a portion of the second circumferential rib feature 25 at a diameter that is greater than a diameter just below the point of contact, or location of contact, but less than the maximum diameter 42. Thus, the points or locations of contact between the first and second inner edges 28, 30 and the first syringe plunger 20*a* include instances where the rib feature 25 defines the contact surface area between the track 12 and the first syringe plunger 20*a*.

As previously referenced, although FIG. 4 shows the first syringe plunger 20*a* supported at the second circumferential rib feature 25, other contact features, such as other circumferential rib features, may be used to support the first syringe plunger 20*a*, and thus to support the plurality of syringe plungers 20. To reiterate, the points of contact between the first syringe plunger 20*a* and the track 12 may be at any of a variety of locations along the height of the first syringe plunger 20*a*. In other words, the first syringe plunger 20*a* may be engaged at one or more points of contact below or at any of the other contact features 23 of the plurality of syringe plungers.

As shown, the first side 34 and second side 36 of the track 12 may be spaced, or define a width, that is relatively close to the outer diameter of the first portion 27 of the first syringe plunger 20*a* to minimize lateral, or side-to-side tilting of the first syringe plunger 20*a*. A height defined by each the first side 34 and the second side 36 of the base portion 38 may be greater than a length of the first portion 27 of the first syringe plunger 20*a*. In this way, or in another manner, the track 12 may be configured such that the bottom surface 31 of the first syringe plunger 20*a* is not in contact with the bottom 32 of the base portion 38. In some embodiments, the variation of the height of the first portion 27 of the first syringe plunger 20*a*, or variation in the placement and/or size of the circumferential rib feature 26 may result in design variations to one or more dimensions of the track 12.

In terms of facilitating locomotion, the lack of contact between the bottom 32 of the base portion 38 and the bottom surface 31 of the first syringe plunger 20*a*, and thus the plurality of syringe plungers 20, may reduce stiction between the bottom surface 31 of the first syringe plunger 20*a*, and thus help increase throughput and reduce instances of intervention required by the operator for maintaining the desired positioning of the plurality of syringe plungers 20 along the track 12. This feature can be particularly advantageous where the bottom surface 31 of the first syringe plunger 20*a* is an elastomer that is free of silicone oil, or other lubricants (whether dry, oil-based, or of another nature). Further, in these embodiments, the one or more points of contact defining where the first syringe plunger 20*a* is engaged by the track 12 are located closer longitudinally to a center of mass of the first syringe plunger 20*a* than the bottom surface 31 is located relative to the center of mass of the first syringe plunger 20*a*, or in some cases, above the center of mass of the first syringe plunger 20*a*. Thus, the one or more points of contact are positioned at a longitudinal distance from a center of mass of the first syringe plunger 20*a* that is less than a longitudinal distance between the bottom surface 31 and the center of mass of the first syringe plunger 20*a*. By supporting the syringe plunger 20*a* nearer to the center of mass of the first syringe plunger 20*a* than if the syringe plunger 20*a* were supported on its bottom surface 31, or at a location above the center of mass of the syringe plunger 20*a*, the risk of the first syringe plunger 20*a* tipping is reduced. In different terms, by being supported by the first and second inner edges 28, 30, the propensity of the first syringe plunger 20*a* to tip is reduced or decreased, with a similar effect on each of the plurality of syringe plungers 20 within the track 12, thereby contributing to the increased throughput and reduced instances of intervention.

While FIG. 4 illustrates the use of track 12 with the first syringe plunger 20*a* having a first circumferential rib feature 21, a second circumferential rib feature 25, and third circumferential rib feature 26, the track 12 may be used in combination with differing embodiments of the first syringe plunger 20*a*. Along these lines, various additional examples of shown and described with reference to FIGS. 5A and 5B.

FIG. 5A is a cross-sectional view of an additional example of the track 12 in use with an additional embodiment of a syringe plunger, for example, a second syringe plunger 20*b*. While the following is described with reference to the second syringe plunger 20*b* in use with the track 12, the description may apply to any of the plurality of syringe plungers 20. In this embodiment, the second syringe plunger 20*b* also includes one or more contact features 23, and in this case the second circumferential rib feature 25. As shown in FIG. 5A, the first and the second circumferential rib features 21, 25 have generally the same diameter. In various embodiments, the first circumferential rib feature 21 may have a larger diameter than a diameter of the second circumferential rib feature 25, but the diameter of the second circumferential rib feature 25 is greater than the width 40 (FIG. 3) of the track 12. As illustrated, the first portion 27 of the second syringe plunger 20*b* is positioned between the first and second sides 34, 36 of the track 12. In this illustrative embodiment, the second circumferential rib feature 25 is supported by the first shoulder portion 16 and the second shoulder portion 18 of the track 12. The width 40 (FIG. 3) of the track 12 has a value less than the diameter of the second circumferential rib feature 25 such that the second syringe plunger 20*b* is suspended from the first and second shoulder portions 16, 18.

FIG. 5B illustrates an additional example of track 12 in use with one of a plurality of syringe plungers 20, for example, a third syringe plunger 20*c*. In this embodiment, the third syringe plunger 20*c* comprises the first circumferential rib feature 21 and the second circumferential rib feature 25. As illustrated, the first circumferential rib feature 21 has a diameter that is larger than a diameter of the second circumferential rib feature 25. As illustrated and in use with track 12, the first circumferential rib feature 21 serves as the contact feature 23 and is supported by the first shoulder portion 16 and the second shoulder portion 18. The diameter of the second circumferential rib feature 25 is less than the width 40 (FIG. 3) of the track 12 such that the first portion 27 of the third syringe plunger 20*c* below the first circumferential rib feature 21 fits within a portion of the track 12 between the first side 34 and the second side 36. In this way, the third syringe plunger 20*c*, and thus each of the plurality of syringe plungers 20, is suspended from the first and second shoulder portions 16, 18 such that the bottom surface 31 of the syringe plunger 20*c* does not contact the bottom 32 of the base portion 38 of the track 12.

In various embodiments, the track 12 may be used with varying syringe plungers, such as a syringe plunger having one circumferential rib feature supported by the first and second shoulder portions 16, 18. In other embodiments, the syringe plunger may have three or more circumferential rib features and/or generally indented portions. In these embodiments, with reference to the track 12, any of the circumferential rib features may serve as contact features supported by the first and second shoulder portions 16, 18 as long as the remaining diameter of the syringe plunger below the chosen contact feature is less than the width 40 (FIG. 3).

Figure 6:
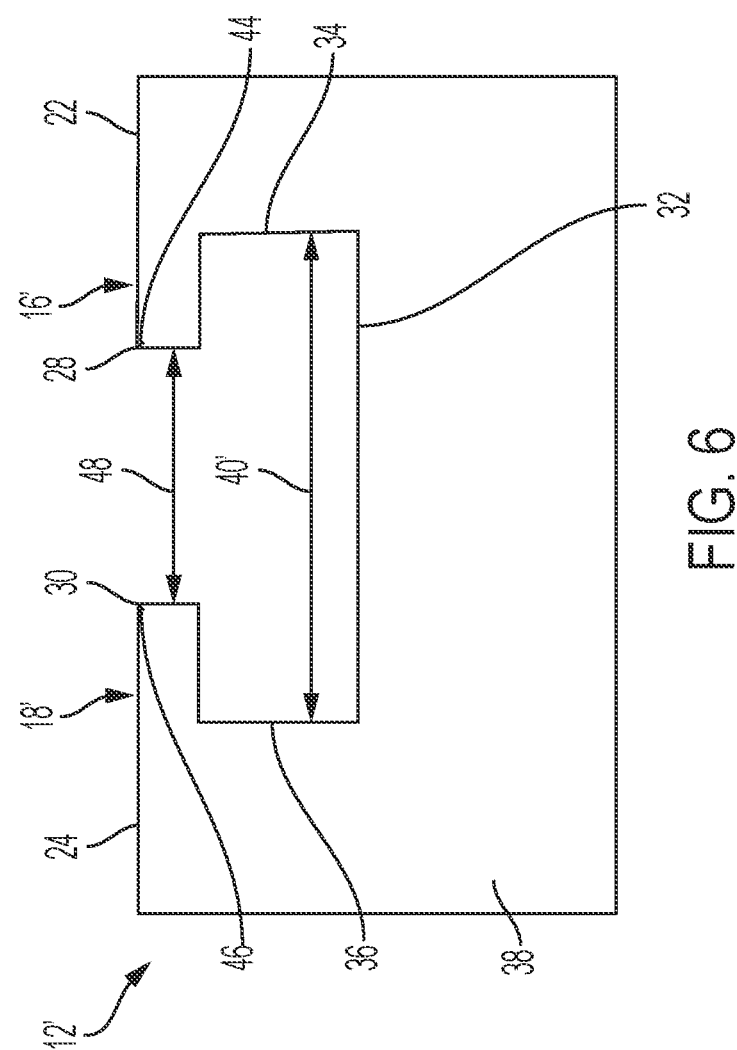
FIG. 6 is a cross-sectional view of a track, according to some embodiments.

FIG. 6 shows a cross-sectional view of a track 12', according to some embodiments. As shown, the track 12' includes the base portion 38 that, in turn, includes the bottom 32, the first side 34 extending from the bottom 32, and the second side 36 extending from the bottom 32. The track 12' also includes a first shoulder portion 16' located at the top of the first side 34 of the base portion 38 and a second shoulder portion 18' located at the top of the second side 36 of the base portion 38. The first and second shoulder portions 16', 18' each extend along the length 14 (FIG. 2) of the track 12' (e.g., along an entire length of the track, or only along one or more portions thereof). The first shoulder portion 16' includes the first support surface 22 which defines the first inner edge 28. The second shoulder portion 18' includes a second support surface 24 which defines a second inner edge 30.

In various embodiments, as previously described with reference to FIG. 3, each of the first and second inner edges 28, 30 are radiused, chamfered, or otherwise modified in an effort to reduce potential plunger damage during conveyance along the inner edges 28, 30. For example, the first inner edge 28 can define a first radius of curvature 44 and the second inner edge 30 can define a second radius of curvature 46. The first radius of curvature 44 and the second radius of curvature 46 may be substantially the same. Various surface modifications may be applied to the first and second inner edges 28, 30 such as a surface coating of the edges, or varying the radius of curvatures 44, 46, to promote performance of the track 12'.

As shown, the second side 36 of the base portion 38 is located opposite the first side 34. The base portion 38 is generally U-shaped, according to some embodiments, with the first side 34 and the second side 36 both extending from the bottom 32. In some examples, the first side 34 and the second side 36 extend orthogonally from the bottom 32 and each have a height that are equal.

As shown, the first inner edge 28 and the second inner edge 30 may each define a height that are equal. In various embodiments, the dimensions of the first inner edge 28 and the second inner edge 30 are chosen such that a combined height of the first inner edge 28 and the first side 34 of the base portion 38, and a combined height of the second inner edge 30 and the second side 36, are greater than a height of a suspended portion, or a first portion, of each of the plurality of syringe plungers (FIG. 1).

As illustrated in FIG. 6, the first inner edge 28 of the first shoulder portion 16' extends inwardly from the first side 34 of the base portion 38 and the second inner edge 30 of the second shoulder portion 18' extends inwardly from the second side 36. The shoulder portions 16', 18' form protrusions that are configured for the suspension of each of the plurality of syringe plungers 20 within the track 12', as will be discussed further with reference to FIGS. 7A and 7B.

Although the first and second shoulder portions 16', 18' are illustrated as generally rectangularly shaped protrusions, the protrusions may be generally triangular or semicircular, for example, along with other configurations. While illustrated protruding horizontally, with a flat or horizontal support surface, in various embodiments, the first and second shoulder portions 16', 18' may extend at an angle generally upwards or downwards to present an angled support surface. The first and second inner edges 28, 30 of the first and second shoulder portions 16', 18', respectively, define a narrowed width 48 relative to a width 40' between the first and second sides 34, 36 of the base portion 38. In general terms, and as will be subsequently described, in various examples the first and second inner edges 28, 30 are configured to engage with a portion of each of the syringe plungers 20, at some location between the top and bottom surfaces 33, 31 of the syringe plungers 20 such that the syringe plungers 20 are supported between the top and bottom surfaces 33, 31 of the syringe plungers 20.

The width 40' between the first and second sides 34, 36 of the base portion 38 is generally greater than the diameter of the portion of each of the stoppers 20 that is received between the first and second sides 34, 36. For example, in various embodiments, the width 40' is greater than a diameter of a portion of each of the syringe plungers 20 that extends below the first and second inner edges 28, 30. In turn, in various embodiments, the narrowed width 48 defined by first and second inner edges 28, 30 of the first and second shoulder portions 16', 18' has a value that is less than a diameter of a contact feature of each of the plurality of syringe plungers 20, as will be described further with reference to FIGS. 7A and 7B.

FIG. 7A illustrates a cross-sectional view of the track 12' of FIG. 6, in use with a plunger of the plurality of syringe plungers 20, specifically with a fourth syringe plunger 20d. As shown, in various embodiments the fourth syringe plunger 20d comprises one or more contact features 23, and specifically the second circumferential rib feature 25. As illustrated in FIG. 7A, the first and second shoulder portions 16', 18' are received in the first indented area 37 of the fourth syringe plunger 20d, such that the second circumferential rib feature 25 is positioned on top of, and is supported by, the first and second shoulder portions 16', 18'. As shown, the maximum outer diameter 42 of the fourth syringe plunger 20d is located within the track 12', although the maximum outer diameter 42 may be located above the track 12' in other embodiments. As shown in FIG. 7A, the maximum outer diameter 42 is located within the track 12' without impeding the suspension of each of the plurality of syringe plungers 20. This can be facilitated by ensuring the ratio of the width 40' between the first and second sides 34, 36 of the base portion 38 to the narrowed width 48 defined by first and second inner edges 28, 30 of the first and second shoulder portions 16', 18' being greater than a value of one. Under these circumstances, portions of the fourth syringe plunger 20d that have a diameter greater than the value of narrowed width 48 may be accommodated within the portion of the track 12 defined by the width 40'. For example, in the illustrative embodiment of FIG. 7A, the third circumferential rib feature 26 has a diameter that is greater than the narrowed width 48. As shown, the height of the first side 34 in combination with the first inner edge 28, and the height of the second side 36 in combination with the height of the second inner edge 30, are each greater than the height of the first portion 27 of the fourth syringe plunger 20d, such that the bottom surface 31 of the fourth syringe plunger 20d does not contact the bottom 32 of the base portion 38. This feature of avoiding contact at the ends can provide various advantages, as previously described.

FIG. 7B illustrates a top view of the track 12' in use with the fourth syringe plunger 20d as illustrated in FIG. 7A. As previously described with reference to first syringe plunger 20a (FIG. 4), the top surface 33 of the fourth plunger 20d has a surface area and a planar projection of the top surface 33 of the fourth plunger 20d also has a surface area (defined in further detail below). In embodiments, the surface area of the planar projection of the top surface 33 is approximately the same as a surface area of a planar projection of the bottom surface 31 (FIG. 7A), and as described further below with reference to FIG. 8. Further, in this illustrative embodiment, the second circumferential rib feature 25 is illustrated overlapping with the first and second shoulder portions 16', 18' such that there is a contact area formed between the track 12' and the fourth syringe plunger 20d. The contact area comprises a contact surface area which is defined by the surface area available for overlapping contact with the track 12'.

Figure 8:
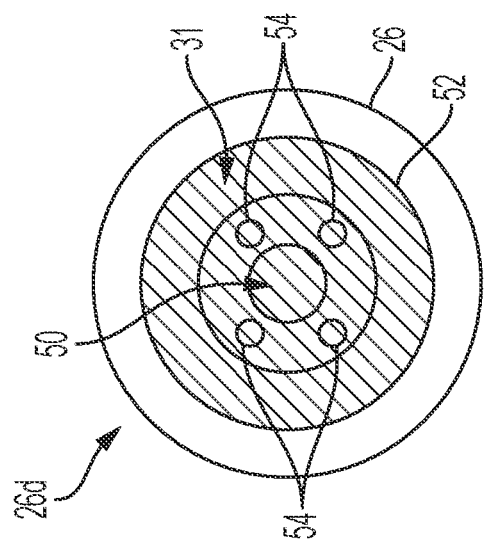
FIG. 8 is a bottom view of the syringe plunger of FIG. 7A, according to some embodiments.

FIG. 8 illustrates a bottom view of the fourth plunger 20*d* of FIG. 7B, according to some examples. As illustrated in FIG. 8, the bottom surface 31 can be seen with the third circumferential rib 26 positioned generally above the bottom surface 31 and extending radially outward relative to the bottom surface 31. In three-dimensional space the bottom of the fourth plunger 20*d* is rounded and has surface features. However, the bottom surface area of the fourth plunger 20*d* can be expressed in the form of a planar projection. In those terms, the planar projection of the bottom surface 31 is a generally planar surface including the area of a central opening 50 within a center of the bottom surface 31. The bottom surface 31 and the associated planar projection of the bottom surface 31 is bounded by an outer circumference 52. In various embodiments, the bottom surface 31 comprises a plurality of projections 54 (e.g., generally hemispherical or dome-shaped projections). The surface area of the planar projection of the bottom surface 31 may be defined as including the total area of planar projection of the bottom surface 31, including the cross-sectional area of the opening 50, such that the surface area of the planar projection of the bottom surface 31 refers to the entire surface area within the outer circumference 52 of the bottom surface 31. In this way, the surface area of the planar projection of the bottom surface 31 is approximately the same as the surface area of the planar projection of the top surface 33 (FIG. 7B).

From at least the foregoing description, it should be clear there are various configurations of syringe plungers that may be used with tracks, such as track 12', in accordance with various embodiments. For example, the first, second and third syringe plungers 20*a*, 20*b*, 20*c* previously described may each be used with track 12'. And, the fourth syringe plunger 20*d* may also be used with the track 12 (e.g., by flipping, or reorienting the fourth syringe plunger 20*d* top-down). Still other configurations are imagined within the scope of the present embodiment. For example, each of the plurality of syringe plungers 20 may comprise a single circumferential rib feature that is supported by the first and second shoulder portions 16', 18' of track 12'. In other embodiments, each of the plurality of syringe plungers 20 includes four, five, six, or more circumferential rib features and/or generally indented portions. The tracks 12, 12' may be appropriately modified so that any of the circumferential rib features or other contact feature may be supported by first and second shoulder portions 16, 18 or first and second shoulder portions 16', 18'.

The various dimensions and values presented throughout the present disclosure are example dimensions and are given for reference purposes only. The principles disclosed throughout are applicable to any of a variety of syringe plunger sizes and the example dimensions may be scaled or altered to apply to various syringe plunger sizes. Further, the example dimensions of the tracks may be scaled or altered to accommodate varying dimensions of the syringe plungers. For example, with reference to each of the plurality of syringe plungers 20, the contact surface area defined by the one or more contact features 23 can be 0.1% to 5.0%, for example, that of the planar projection of the bottom surface area or the planar projection of the top surface area of a particular syringe plunger. In terms of track design, the contact surface of the one or more contact features may define a ratio to the width 40 (FIG. 4), or the narrowed width 48 (FIG. 6), of 1.0% to 12.0%, for example.

In various examples, by supporting a particular syringe plunger using a relatively small contact area (i.e., using a relatively narrower contact feature) the contact feature surface area is minimized. This, in turn, can help reduce stiction between the track on which it is riding (e.g., tracks 12, 12') and the syringe plungers. Although, a value that is too little for the contact feature surface area may reduce the stability of each of the plurality of syringe plungers 20 on the track 12, 12'. It is desired for the contact feature surface area to not surpass an upper limit in order to avoid too much stiction between each of the plurality of syringe plungers 20 and the track 12, 12'.

Figure 9:
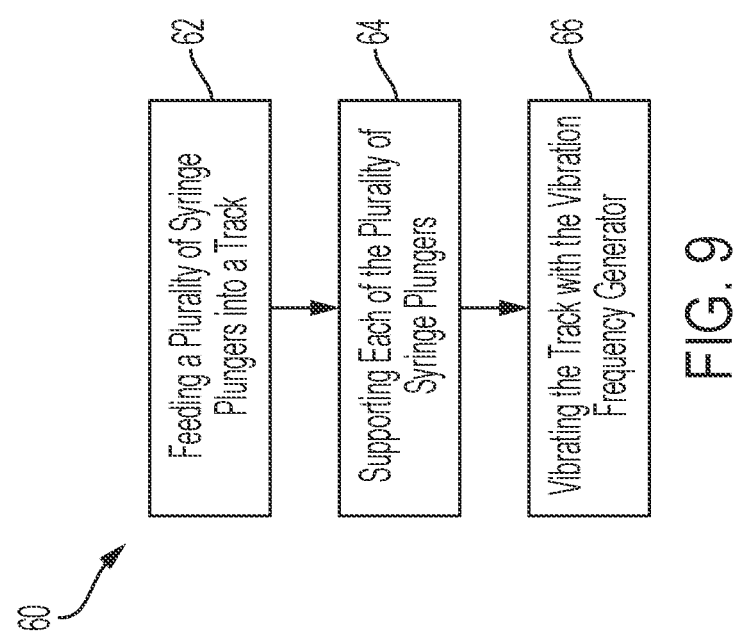
FIG. 9 is a flow chart illustrating a method for conveying a plurality of syringe plungers with the vibratory motion conveyer system of FIG. 1, according to some embodiments.

FIG. 9 is a flow chart illustrating a method 60 of conveying the plurality of syringe plungers 20 using a vibratory motion conveyer system. The method 60 will be described with reference to the vibratory motion conveyer system 10 of FIG. 1 and the track 12 and plurality of syringe plungers 20 described with reference to FIGS. 3, 4, 5A and 5B. The method 60 may similarly be used with the track 12' described with reference to FIG. 6.

At block 62, the method 60 includes feeding the plurality of syringe plungers 20 into the track 12. The track 12 may be operatively coupled to the vibration frequency generator 13. In some examples, each syringe plunger of the plurality of syringe plungers 20 is substantially free of silicone oil when conveyed in the track 12. As described, the track 12 includes the first shoulder portion 16 extending along the track 12 and the second shoulder portion 18 extending along the track 12 opposite to the first shoulder portion 16. For reference, a similar process is optionally employed with the track 12'.

At block 64, the method 60 further includes supporting each of the plurality of syringe plungers 20 with the track 12 (or track 12'), as described with reference to FIG. 4. A contact feature between the top and bottom of each syringe plunger, such as the second circumferential rib feature 25, is supported by the first support surface 22 of the first shoulder portion 16 of the track 12 and the second support surface 24 of the second shoulder portion 18 of the track 12. In this way, each syringe plunger of the plurality of syringe plungers 20 extends between the first and second inner edge 28, 30 of the first and second support surfaces 22, 24, respectively. Each of the plurality of syringe plungers 20 does not come into contact with the bottom 32 of the base portion 38 of the track 12 as a result of the support by the first support surface 22 and second support surface 24. In different terms, the top and bottom surfaces of the syringe plungers do not contact the track 12.

In various embodiments, when method 60 is used with the track 12' (FIG. 6) and the plurality of syringe plungers 20 (FIG. 7A, 7B), a generally indented portion of each of the syringe plungers 20, such as the first indented area 37 of first syringe plunger 20*a*, and therefore of each of the plurality of syringe plungers 20, may be positioned within the narrowed width 48 of the track 12'. In this way, a portion (e.g., a majority), but not the entirety, of first portion 27 of first syringe plunger 20*a* is closely surrounded by the track 12'. Similarly to the use with track 12, the bottom surface 31 of the first syringe plunger 20*a* remains arranged to avoid direct contact with the bottom 32 of the base portion 38.

At block 66, the method 60 further includes vibrating the track 12 with the vibration frequency generator 13. The vibration of the track 12 causes the plurality of syringe plungers 20 to travel along the track 12 (or track 12', as applicable). In some embodiments, the track 12 is vibrated at a frequency from 1 to 180 hertz. In preferred embodiments, the track 12 is vibrated at a frequency of 60 hertz, although any of a variety of values are contemplated. The support of the contact feature (e.g., second circumferential rib feature 25) of each of the plurality of syringe plungers 20 between the first inner edge 28 and the second inner edge 30 eliminates contact between a bottom 32 of the base portion 38 of the track 12 (FIG. 4) and a bottom surface 31 of each of the plurality of syringe plungers 20 (FIG. 4). Again, this may eliminate stiction between the plurality of syringe plungers 20 and the track 12, among other advantages, thus increasing the efficiency of the transport of the plurality of syringe plungers 20.

Persons skilled in the art will readily appreciate that various aspects of the present disclosure can be realized by any number of methods and apparatuses configured to perform the intended functions, such as, but not limited to, limiting enhancing vibratory conveyance of syringe plungers. Such enhancements may be beneficial as a means for improving conveyance of syringe plungers that are substantially free of silicone oil or other lubricants. It should also be noted that the accompanying drawing figures referred to herein are not necessarily drawn to scale, but may be exaggerated to illustrate various aspects of the present disclosure, and in that regard, the drawing figures should not be construed as limiting.

Various modifications and additions can also be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A vibratory motion conveyor system including a plurality of syringe plungers each having a contact feature and a track, the track having a length configured to support the plurality of syringe plungers, each syringe plunger of the plurality of syringe plungers having a top, a bottom, a main body, and the contact feature projecting from the main body, the contact feature being a circumferential rib feature having a width, and the contact feature being positioned between the top and the bottom of the syringe plunger, the track comprising:
   a first shoulder portion extending along the length of the track, the first shoulder portion having a first support surface defining a first inner edge; and
   a second shoulder portion extending along the length of the track opposite to the first shoulder portion, the second shoulder portion having a second support surface defining a second inner edge, the first and second inner edges being arranged opposite one another such that the first and second support surfaces are configured to support the contact feature of each syringe plunger such that a portion of each syringe plunger passes between the first and second inner edges of the first and second support surfaces, respectively,
   wherein each of the first and second inner edges are radiused such that the first inner edge defines a first radius of curvature and the second inner edge defines a second radius of curvature that is not greater than the width of the contact feature.

2. A vibratory motion conveyor system including a plurality of syringe plungers, the system comprising:
   a vibration frequency generator; and
   a track operatively coupled to the vibration frequency generator, the track having a length configured to support the plurality of syringe plungers, each syringe plunger of the plurality of syringe plungers having a top, a bottom, a main body, and a contact feature extending from the main body defining a circumferential rib feature having a width, and the contact feature being positioned between the top and the bottom of the syringe plunger, the track including,
   a first shoulder portion extending along the length of the track, the first shoulder portion having a first support surface defining a first inner edge, and
   a second shoulder portion extending along the length of the track opposite to the first shoulder portion, the second shoulder portion having a second support surface defining a second inner edge, the first and second inner edges being arranged opposite one another such that the first and second support surfaces are configured to support the contact feature of each syringe plunger such that a portion of each syringe plunger passes between the first and second inner edges of the first and second support surfaces, respectively, and the bottom of each syringe plunger does not contact the track,
   wherein each of the first and second inner edges are radiused such that the first inner edge defines a first radius of curvature and the second inner edge defines a second radius of curvature that is not greater than the width of the contact feature.

3. The system of claim 2, wherein the track further includes a base portion having a bottom, a first side extending from the bottom, and a second side extending from the bottom, the second side being located opposite the first side, and further wherein the first shoulder portion is located at the top of the first side and the second shoulder portion is located at the top of the second side.

4. The system of claim 3, wherein the base portion is U-shaped, with the first and second sides extending orthogonally from the bottom.

5. The system of claim 2, wherein the vibration frequency generator is operable to apply a vibratory frequency from 1 to 180 hertz.

6. A method of conveying a plurality of syringe plungers with a vibratory motion conveyor system, the method comprising:
   feeding the plurality of syringe plungers into a track operatively coupled to a vibration frequency generator, each syringe plunger of the plurality of syringe plungers having a contact feature extending from a main body of the syringe plunger that is a circumferential rib feature having a width, the track having a first shoulder portion extending along the track and a second shoulder portion extending along the track opposite to the first shoulder portion;
   supporting the contact feature of each of the plurality of syringe plungers with a first support surface of the first shoulder portion and a second support surface of the second shoulder portion such that each syringe plunger extends between first and second inner edges of the first and second support surfaces, respectively and a bottom of each of the syringe plungers does not contact the track, wherein each of the first and second inner edges are radiused such that the first inner edge defines a first radius of curvature and the second inner edge defines a second radius of curvature that is not greater than the width of the contact feature; and vibrating the track with the vibration frequency generator such that the plurality of syringe plungers travel along the track.

7. The method of claim 6, wherein the track is vibrated at a frequency from 1 to 180 hertz.

8. The method of claim 6, wherein the circumferential rib feature of each of the plurality of syringe plungers corresponds to a maximum outer diameter of each of the plurality of syringe plungers.

9. The method of claim 6, wherein each of the plurality of syringe plungers is free of silicone oil.

10. The method of claim 6, wherein the track further includes a base portion having a bottom, a first side extending from the bottom, and a second side extending from the bottom, the second side being located opposite the first side, and further wherein each of the plurality of syringe plungers travels along the track without contacting the bottom of the base portion of the track.

11. The method of claim 6, wherein the contact feature includes a fluoropolymer material, optionally polytetrafluoroethylene.

12. A vibratory motion conveyor system including a plurality of plungers and a track, the track configured to support the plurality of syringe plungers, each syringe plunger of the plurality of syringe plungers having a top surface, a bottom surface, a main body, and a contact feature extending from the main body, the contact feature being positioned between the top surface and the bottom surface of the syringe plunger, the track comprising:
  a first shoulder portion extending along a length of the track, the first shoulder portion having a first support surface defining a first inner edge; and
  a second shoulder portion extending along the length of the track opposite to the first shoulder portion, the second shoulder portion having a second support surface defining a second inner edge, the first and second inner edges being arranged opposite one another such that the first and second support surfaces are configured to support the contact feature of each syringe plunger,
  wherein each of the first and second inner edges are radiused such that the first inner edge defines a first radius of curvature and the second inner edge defines a second radius of curvature that is not greater than the width of the contact feature.

13. The track of claim 12, wherein the contact feature of each of the plurality of syringe plungers is a circumferential rib feature.

14. The track of claim 12, wherein the contact feature of each of the plurality of syringe plunger is a generally indented portion of each syringe plunger.

15. The track of claim 12, wherein a portion of each of the plurality of syringe plungers passes between the first inner edge of the first shoulder portion and the second inner edge of the second shoulder portion of the track.

16. The track of claim 12, wherein each syringe plunger has a center of mass and the contact feature is located above the center of mass of each of the syringe plungers.

17. A vibratory motion conveyor system including a plurality of plungers and a track, the track having a length configured to support the plurality of syringe plungers, each syringe plunger of the plurality of syringe plungers having at least one contact feature and a bottom surface, the at least one contact feature having a contact surface area that is smaller than a surface area of a planar projection of the bottom surface, the track comprising:
  a first shoulder portion extending along the length of the track, the first shoulder portion having a first support surface defining a first inner edge;
  a second shoulder portion extending along the length of the track opposite to the first shoulder portion, the second shoulder portion having a second support surface defining a second inner edge, the first and second inner edges being arranged opposite one another such that the first and second support surfaces are configured to support the at least one contact feature of each syringe plunger,
  wherein each of the first and second inner edges are radiused such that the first inner edge defines a first radius of curvature and the second inner edge defines a second radius of curvature that is not greater than the width of the contact feature.

18. The track of claim 17, wherein the contact surface area comprises a lower limit and an upper limit, such that stiction between the contact surface area and the track is reduced.

19. The track of claim 17, wherein the contact surface area has a ratio to a width defined between the first inner edge and the second inner edge of 1.0% to 12.0%.

20. A vibratory motion conveyor system including a plurality of plungers and a track, the track configured to support the plurality of syringe plungers, each syringe plunger of the plurality of syringe plungers having a contact feature with one or more points of contact with the track, each syringe plunger of the plurality of syringe plungers having a center of mass between a top surface and a bottom surface of the syringe plungers, and the contact feature being between the top surface and the bottom surface, the track comprising:
  a first shoulder portion extending along a length of the track, the first shoulder portion having a first support surface defining a first inner edge; and
  a second shoulder portion extending along the length of the track opposite to the first shoulder portion, the second shoulder portion having a second support surface defining a second inner edge, the first and second inner edges being arranged opposite one another such that the first and second support surfaces are configured to support each syringe plunger at the at least one point of contact,
  wherein each of the first and second inner edges are radiused such that the first inner edge defines a first radius of curvature and the second inner edge defines a second radius of curvature that is not greater than the contact feature.

* * * * *